United States Patent [19]

Okuyama et al.

[11] 4,088,932
[45] May 9, 1978

[54] CONTROL SYSTEM FOR COMMUTATORLESS MOTOR

[75] Inventors: Toshiaki Okuyama; Yuzuru Kubota, both of Hitachi, Japan

[73] Assignee: Hitachi, Ltd., Japan

[21] Appl. No.: 778,097

[22] Filed: Mar. 16, 1977

[30] Foreign Application Priority Data

Mar. 17, 1976 Japan .................................. 51-28063

[51] Int. Cl.² .......................................... H02K 29/00
[52] U.S. Cl. ..................................... 318/138; 318/176; 318/175
[58] Field of Search ............... 318/176, 175, 174, 178, 318/179, 138, 254, 227, 230

[56] References Cited

U.S. PATENT DOCUMENTS

| 3,354,368 | 11/1967 | Williamson | 318/176 |
| 3,949,283 | 4/1976 | Okuyama et al. | 318/138 |
| 3,997,824 | 12/1976 | Miyasita et al. | 318/171 |

Primary Examiner—Herman J. Hohauser
Attorney, Agent, or Firm—Craig & Antonelli

[57] ABSTRACT

A control system for a commutatorless motor, comprising a synchronous motor having a polyphase armature winding and a field winding; a frequency converter for supplying the armature winding with alternating current having a variable frequency; an angular position detector for detecting the angular position signal corresponding to the angular position of the rotor of the synchronous motor; a speed control circuit for delivering a current reference signal having an amplitude corresponding to the deviation of the actual speed of the synchronous speed from the reference speed; a current control circuit for controlling the amplitude of the output current of the frequency converter in accordance with the current reference signal and for maintaining the amplitude of the output current of the frequency converter constant in the range where the torque reference signal assumes a value smaller than the intermittent threshold of the armature current; and a phase control circuit for controlling the phase of the output current of the frequency converter in accordance with the angular position signal and for rendering the phase of the output current of the frequency converter variable in accordance with the current reference signal in the region where the torque reference signal takes a value smaller than the intermittent threshold of the armature current.

7 Claims, 10 Drawing Figures

CONTROL SYSTEM FOR COMMUTATORLESS MOTOR

BACKGROUND OF THE INVENTION

1. Field of the Invention

The present invention relates to a control system for a commutatorless motor, in which a synchronous motor is driven by a frequency converter comprising thyristors, and more particularly to a control system for a commutatorless motor, which is free from a change in response in the speed control loop caused by a change in a load and therefore capable of control with highly reliable response.

2. Description of the Prior Art

A commutatorless motor, as well known, is a variable speed motor which is a combination of a synchronous motor and a frequency converter comprising thyristors for controlling the motor and which has no commutator and brush. The commutatorless motor is advantageous in that it has a very wide range of controllable speed and that its lack of commutator and bursh facilitates maintenance and check.

In case where a load with large fluctuation such as a steel rolling mill is driven by such a commutatorless motor, the load-dependent current intermits when the load shifts to a light level. As well known, the gain of the current control circuit provided as a minor loop in the speed control loop, largely varies in the continuous range (where the load-dependent current is continuous) and in the discontinuous range (where the load-dependent current intermits). Namely, the gain of the current control circuit falls to a great extent in the discontinuous range. However, since the response characteristic of the speed control loop must be adjusted in accordance with that in the discontinuous range, the response characteristic in the continuous range is therefore liable to be degraded and unstable. Consequently, it is difficult to obtain a satisfactory characteristic of control.

SUMMARY OF THE INVENTION

The object of the present invention is to provide a control system for a commutatorless motor, in which a large variation in the gain of the current control circuit is prevented and the speed control loop has a high quality of response.

The feature of the present invention is to maintain the amplitude of the armature current constant when the torque reference signal takes a value smaller than the current intermittent threshold and at the same time to control the phase of the armature current in accordance with the torque reference signal so as to maintain the ratio of the output torque of the motor to the instructed torque substantially constant, independent of the load-dependent current (hereafter referred to simply as load current).

Other objects and features of the present invention will be made clear in the following description of the specification.

DESCRIPTION OF THE PREFERRED EMBODIMENTS

Figure 1:
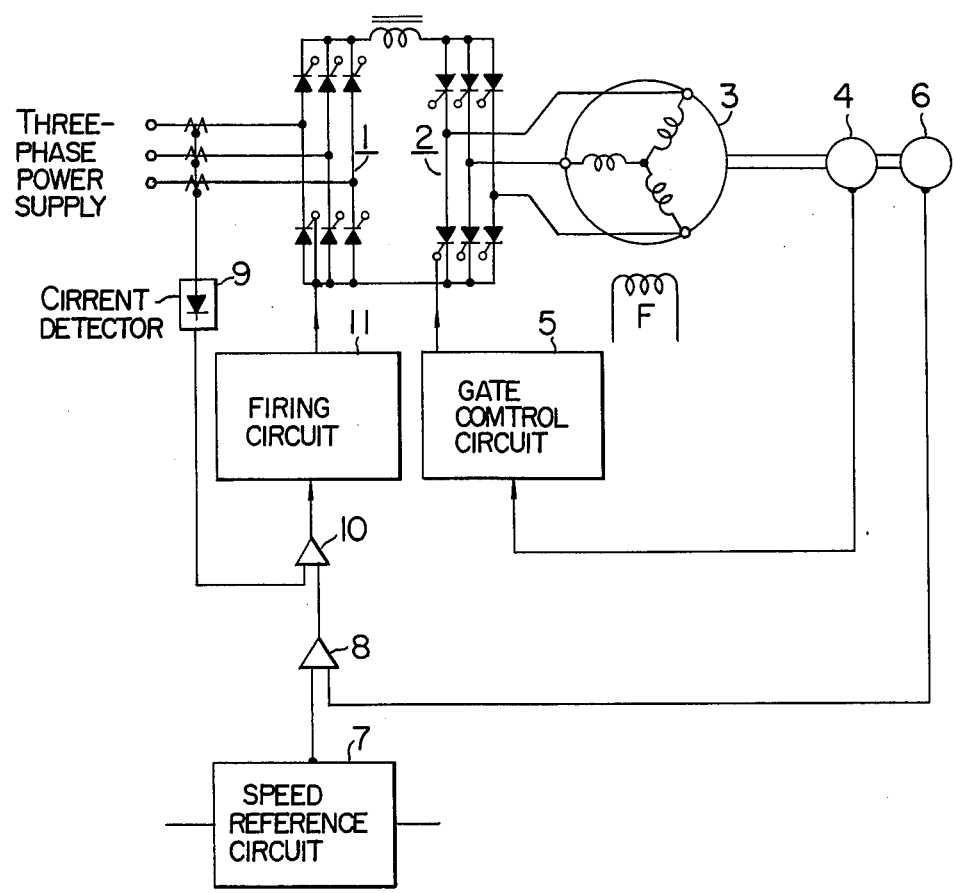
FIG. 1 schematically shows a circuit of a conventional control system for a commutatorless motor of dc link type.

FIG. 1 is a schematic circuit of a control system for a commutatorless motor of dc link type as a typical example of the above mentioned commutatorless motor. In FIG. 1, reference numeral 1 indicates a controllable rectifier circuit connected with an ac voltage source (not shown) for converting alternating current to direct current; numeral 2 an inverter circuit for inverting the dc output of the rectifier 1 to an ac voltage having variable frequency; 3 a synchronous motor driven by the inverter 2, having a field winding F; 4 an angular position detector coupled to the rotary shaft of the motor 3 for detecting the angular position of the rotor; 5 a gate control circuit for generating gating signals for firing the thyristors of the inverter 2 in a predetermined order in accordance with the position signal from the angular position detector 4; 6 a speed generator; 7 a speed reference circuit; 8 a speed deviation amplifier for amplifying the deviation of the speed feedback signal which is the output of the speed generator 6 from the speed reference signal of the speed reference circuit 7; 9 a current detector for detecting the ac input current to the rectifier 1; 10 a current deviation amplifier for amplifying the deviation of the current feedback signal of the current detector 9 from the output signal of the speed deviation amplifier 8; and 11 a firing circuit for controlling the firing angles of the thyristors of the rectifier 1.

As well known, the operation of the constitution described above is as follows. The gate control circuit 5 sequentially fires the thyristors of the inverter 2 in accordance with the position signal of the angular position detector so that the phase of the armature current may have a predetermined relation with respect to the phase of the terminal voltage (armature voltage). The firing circuit 11 controls the dc output current of the controllable rectifier circuit 1 by firing the thyristors of the rectifier circuit 1 at phases corresponding to the output of the current deviation amplifier 10. Accordingly, the amplitude of the current through the armature winding of the synchronous motor 3 is controlled. Therefore, the synchronous motor 3 is so controlled as to rotate at a speed on the basis of the speed reference signal of the speed reference circuit 7.

Such a commutatorless motor, however, has the following problem.

Though the currents through the rectifier 1 and the inverter 2 are continuous every instant when the load on the synchronous motor 3 is large and the armature current is also large. When the load is small, the armature current intermits. During the current being intermittent, the gain of the dc ouptput voltage of the rectifier 1 with respect to the control input voltage of the firing circuit 11 (i.e. dc output voltage/control input voltage) is much lower than during the current being continuous. The control input voltage of the firing circuit 11 refers to a signal for controlling the firing phases of the thyristors of the rectifier 1. Due to this phenomenon of intermittent current, the response of the current control circuit constituted of the current detector 9, the current deviation amplifier 10 and the firing circuit 11, changes very much from the continuous range to the discontinuous range.

The phenomenon is similar to one encountered by the static Leonard system for speed control of a dc motor. With the static Leonard system, the phenomenon is compensated by sufficiently improving the response of the current control circuit. In case of the static Leonard system, such a compensation method enjoy a satisfactory effect since the pulsation of the output current of the controllable rectifier circuit is never increased by increasing the response of the current control circuit. In case of a commutatorless motor, however, the increase in the response of the current control circuit causes the large increase in the pulsation of the output current of the rectifier. The increase in the pulsation of the current is ascribed to the operation of the controllable rectifier circuit alone in case of the static Leonard system, but to both the rectifier and the inverter 2 in case of the commutatorless motor. Accordingly, in the latter case, if the response of the current control circuit is increased, the pulsating current component generated by the inverter 2 disturbs the current control circuit so that the pulsating component in the output current is further increased. It is therefore impossible in practice to sufficiently compensate for the response of the current control circuit.

As described above, the discontinuous current increases the pulsating current component so that the improvement in the response of the current control circuit and therefore in the speed control loop is practically impossible. And it is difficult to obtain a desired quality of control.

The present invention has therefore been made to solve the above problem, and concrete embodiments thereof will be described below with the aid of the attached drawings.

Figure 2:
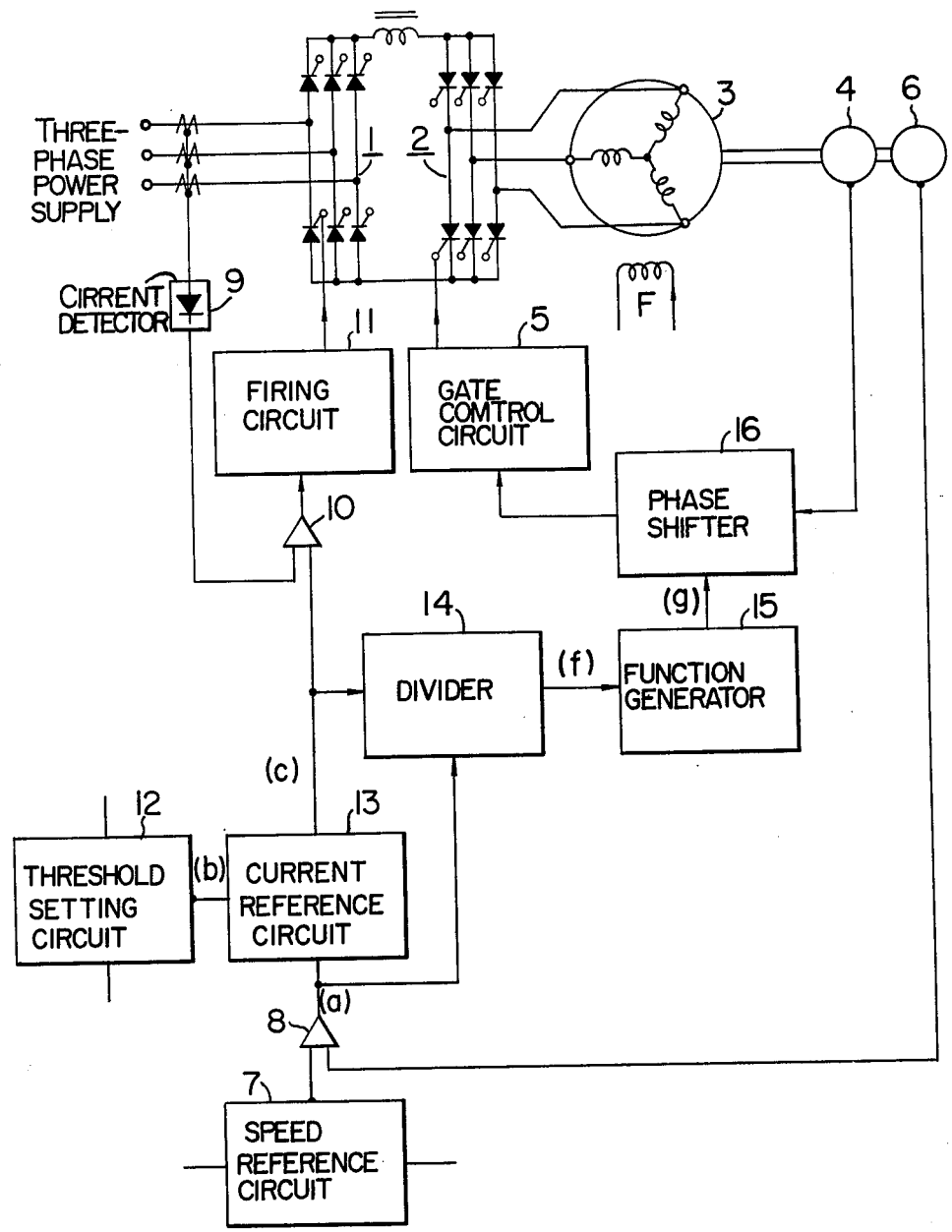
FIG. 2 schematically shows a circuit of a control system for a commutatorless motor, as an embodiment of the present invention.

FIG. 2 shows schematically a circuit of a control system for a commutatorless motor, as an embodiment of the present invention, in which the parts designated by numerals 1 – 11 are the same as the corresponding ones in FIG. 1 and their description will not be duplicated. Reference numeral 12 indicates a current intermittent threshold setting circuit for setting a threshold value at which the armature current of the synchronous motor 3 starts intermitting; numeral 13 a current reference circuit for receiving the torque reference signal $a$ as the output of the speed deviation amplifier 8 and the threshold value $b$ set by the threshold setting circuit 12 and for delivering a current reference signal for instructing the amplitude of the armature current in accordance with the relation described later, the current reference circuit being replaceable by an ordinary selection circuit; 14 a divider for dividing the torque reference signal $a$ by the current reference signal $b$; 15 a function generator circuit for delivering a signal $g$ having a relation described later with respect to the output signal $f$ of the divider 14; and 16 a phase shifter circuit for shifting the phase of the position signal of the angular position detector 4 in accordance with the output of the function generator circuit.

For the better understanding of the present invention, the fundamental principle of the present invention will be described prior to the description of the operation of the embodiment described above.

Figure 3:
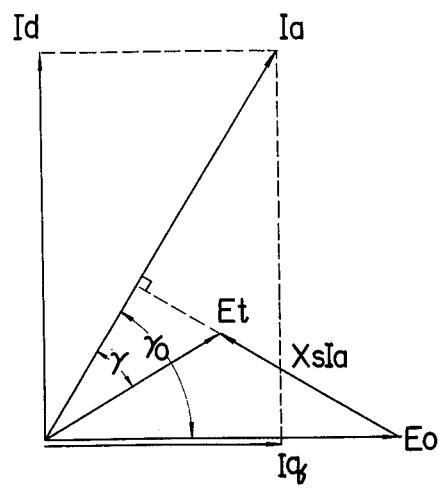
FIGS. 3 and 4 are vector diagrams useful in explaining the principle of operation according to the present invention.

FIG. 3 is a vector diagram concerning a commutatorless motor which is rotating with a lead in power factor. In FIG. 3, $E_o$ is the nominal induced electromotive force, $E_t$ the terminal voltage, $I_a$ the armature current, $I_d$ the direct-axis component of the armature current, $I_q$ the quadrature-axis component of the armature current, $\gamma$ the power factor angle, $X_sI_a$ the synchronous reactance drop, and $\gamma_o$ the present angle of advance.

From FIG. 3, it is understood that the torque $\tau_o$ generated by a three-phase synchronous motor 3 is given by the following expression. In this case, the saliency of the poles of the synchronous motor 3 and the overlapping angles of the inverter 2 are neglected.

$$\tau_o = \frac{3E_t \cdot I_a \cos\gamma}{\omega_r} \qquad (1),$$

$$= \frac{3E_o \cdot I_a \cos\gamma_o}{\omega_r}$$

$$= \frac{3E_o \cdot I_q}{\omega_r}$$

where $\omega_r$ is the angular frequency. In the expression (1), $E_o/\omega_r$ is proportional to the current $I_f$ through the field winding and it follows that $$\tau_o = kI_fI_q \qquad (2)$$

where $k$ is a constant of proportionality. The expression (2) shows that the torque $\tau_o$ is proportional to the quadrature-axis component $I_q$ of the armature current $I_a$.

Figure 4:
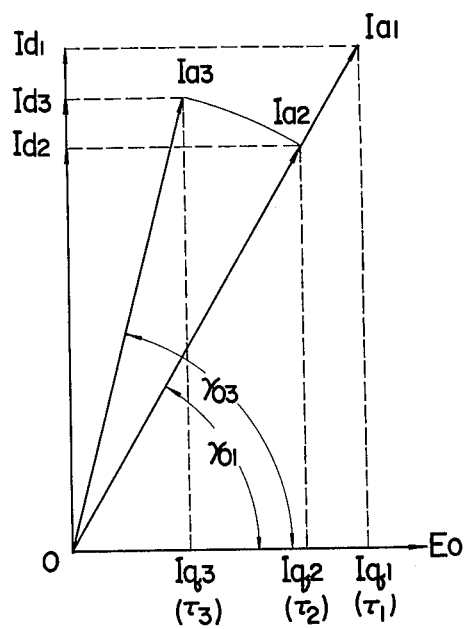

FIG. 4 shows the gradual decrease in the armature current $I_a$ in accordance with the successive decrease in the torque $\tau_o$. Namely, when the torque $\tau_o$ takes values $\tau_1$, $\tau_2$ and $\tau_3$, the current $I_a$ takes the corresponding values $I_{a1}$, $I_{a2}$ and $I_{a3}$.

It is here assumed that the armature current $I_{a2}$ for generating the torque $\tau_2$ is the current intermittent threshold and that the armature current $I_a$ is made proportional to the torque $\tau$ in the continuous range where $\tau > \tau_o$. In the continuous range, the vector of the armature current $I_a$ lies on the line connecting the vector $I_{a2}$ with the vector $I_{a1}$. If the armature current $I_a$ is made proportional to the torque in the range where $\tau \leq \tau_2$, the current $I_a$ decreases to intermit. Accordingly, if the armature current $I_a$ is at the current intermittent threshold $I_{a2}$, the current can be prevented from intermitting by shifting the vector of $I_a$ on and along the circular arc passing the vectors $I_{a2}$ and $I_{a3}$. Since the torque $\tau$ is proportional to the quadrature-axis component $I_q$ of the armature current $I_a$ as seen before and since the output of the speed deviation amplifier 8 is the signal for specifying the amplitude of torque, then the output of the amplifier 8 can be regarded as the signal for specifying the quadrature-axis component. Consequently, the motor can be operated without the armature current being intermittent, by controlling the amplitude and the phase of the armature current in accordance with the relationships shown in FIG. 4 on the basis of the torque reference signal as the output of the speed deviation amplifier.

The foregoing lines are given to the description of the principle of the present invention and now the operation of the circuit shown in FIG. 2 will be described. The torque reference signal $a$ delivered by the speed deviation amplifier 8, which is the deviation of the speed feedback signal from the speed reference signal, is supplied to the current reference circuit 13. The current reference circuit 13 compares the torque reference signal $a$ with the preset threshold $b$ from the threshold setting circuit 12 and delivers one of them that has a larger amplitude. Namely, the current reference circuit 13 delivers the following output $c$ respectively in the continuous range (A range) and the discontinuous range (B range).

In A range, $$c = k_1 a \tag{3a}$$

In B range, $$c = k_1 b \tag{3b},$$

where $k_1$ is a constant.

The current reference signal $c$ is supplied to the current deviation amplifier 10. Accordingly, the amplitude of the armature current $I_a$ is so controlled as to be proportional to the torque reference signal $a$ in the range A and to be maintained equal to the preset threshold specified by the threshold setting circuit 12 in the range B.

The divider 14 divides the signal $a$ by the signal $c$ and delivers the following outputs $f$ in the respective ranges A and B.

In range A, $$f = 1/k_1 \tag{4a}$$

In range B, $$f = a/c = a/k_1 b \tag{4b}$$

Figure 5:
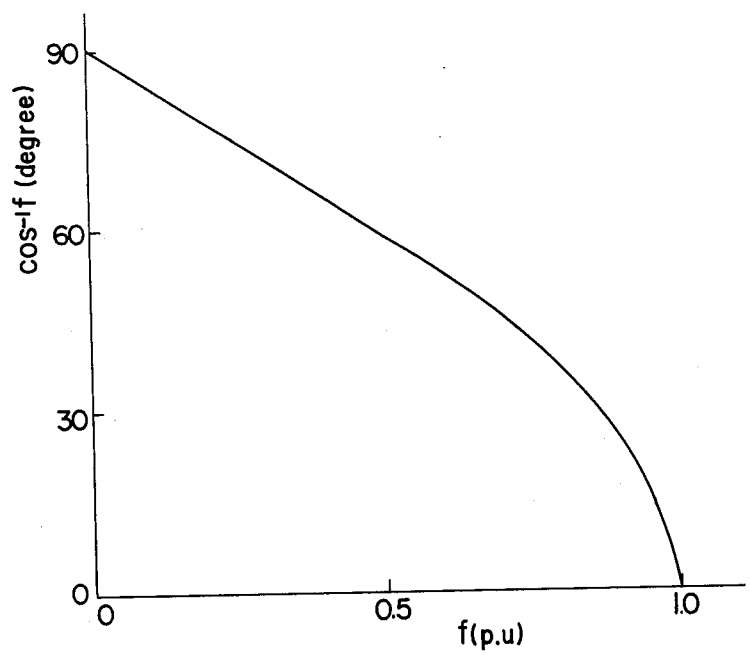
FIG. 5 graphically shows the input-output characteristic of a function generator circuit used in the circuit in FIG. 2.

The output signal $f$ of the divider 14 is sent to the function generator circuit 15, which in turn delivers the signal $g$ as shown in FIG. 5 and given by the following expression.

$$g = \cos^{-1} f \tag{5}$$

The function generator circuit 15 is so provided as to maintain the ratio of the torque to the torque reference signal constant, independent of the amplitude of the torque reference signal, as is seen from FIG. 5 is which the signal is shown to change along the curve. If the ratio changes largely, the speed control loop becomes unstable.

In the so-called commutatorless motor of sinusoidal current source type, the angle $\gamma_o$ of advance is larger than 50° and for that range of the angle the curve shown in FIG. 5 is rendered substantially linear. In this case, therefore, the function generator circuit 15 can be easily constituted of an operational amplifier and a resistor.

The phase shifter circuit 16 has its control input voltage adjusted by the outut signal $g$ of the function generator circuit 15. Namely, the phase shifter circuit 16 makes the phase of the position signal from the angular position detector 4 advance by an angle (leading in phase) proportional to the signal $g$. If the armature current $I_a$ is so designed as to be in phase with the nominal induced electromotive force $E_o$ when the angle in ad- vance caused by the phase shifter 16 is zero, then the phase $\gamma_o$ of the current $I_a$ is controlled as follows in the ranges A and B respectively. Namely, in the range A, it follows from the expressions (4a) and (5) that the phase $\gamma_o$ is made equal to the preset value $$\cos^{-1}(\frac{1}{k_1}).$$

This value is previously so determined that there may be margin angle of commutation. In the range B, on the other hand, the phase $\gamma_o$ is so controlled in some case as to follow the relation given by, for example, the triangle $I_{a3} O I_{q3}$ shown in FIG. 4 such that $$\gamma_o = \cos^{-1} \frac{I_{q3}}{I_{a3}} \tag{6}$$

$$= \cos^{-1} \frac{a}{c}$$

Since the control of the phase $\gamma_o$ of the armature current is as described above, the torque $\tau$ in the respective ranges can be obtained as follows by substituting the relation (6) for the expression (1).

In range A, $$\tau = k_c \cdot k_1 a \cdot \cos(\cos^{-1}(\frac{1}{k_1})) = k_c \cdot a \tag{7a}$$

In range B, $$\tau = k_c \cdot k_1 b \cdot \cos(\cos^{-1}(\frac{a}{k_1 b})) = k_c \cdot a \tag{7b}$$

where $k_c$ is equal to the gain for $\tau/a$.

As seen from the expressions (7a) and (7b), the torque $\tau$ is proportional to the torque reference signal $a$ in both ranges and moreover the gain $k_c$ is the same in both ranges so that $\tau/a$ remains constant.

Figure 6:
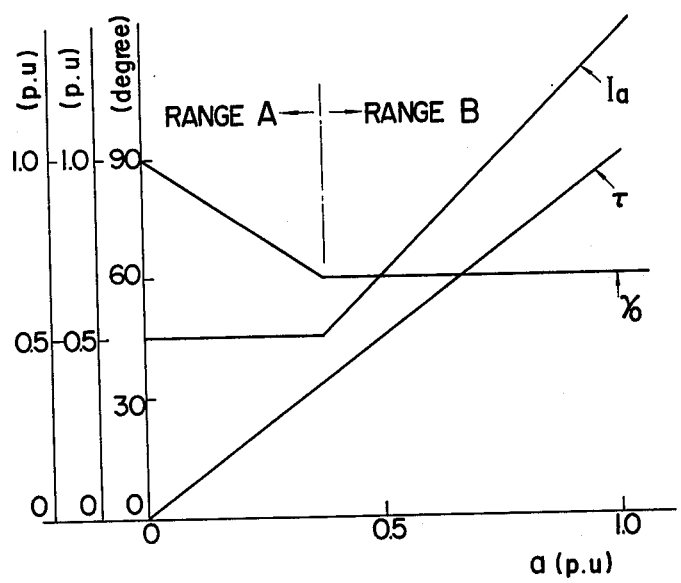
FIG. 6 graphically shows control characteristics according to the present invention.

FIG. 6 schematically shows the changes in the armature current $I_a$, the torque $\tau$ and the angle $\gamma_o$ of advance with respect to the torque reference signal $a$, according to the control system as described above. In the range A, the amplitude of the armature current is controlled and in the range B the angle $\gamma_o$ of advance is controlled while the armature current $I_a$ is kept equal to the current intermittent threshold. The change in the angle $\gamma_o$ of advance coincides with the change in the phase of the armature current $I_a$. Therefore, the torque $\tau$ is proportional to the torque reference signal $a$.

As a result of the above described control of the amplitude and the phase of the armature current $I_a$, the current intermittence can be prevented so that the drawback of response fluctuation in the current control circuit, caused by the intermittent current can be eliminated. Moreover, since the control is so performed that the quadrature-axis component $I_q$ of the armature current $I_a$ may be proportional to the torque reference signal, the ratio of the torque to the torque reference signal can be kept almost constant, independent of the amplitude of the armature current. Consequently, a stable speed control circuit can be provided.

According to the present invention, therefore, the change in the response in the current control circuit due to the current intermittence can be prevented and so the response in the speed control loop can be sufficiently increased without sacrificing stability.

In the above description, the overlapping angle u in the commutation of the thyristors of the inverter 2 is neglected so that the armature current has a lag in phase equal to u/2. Consequently, the accuracy of control of the quadrature-axis component $I_q$ of the armature current $I_a$ in such a manner that the component $I_q$ is proportional to the torque reference signal a, is somewhat degraded.

Figure 7:
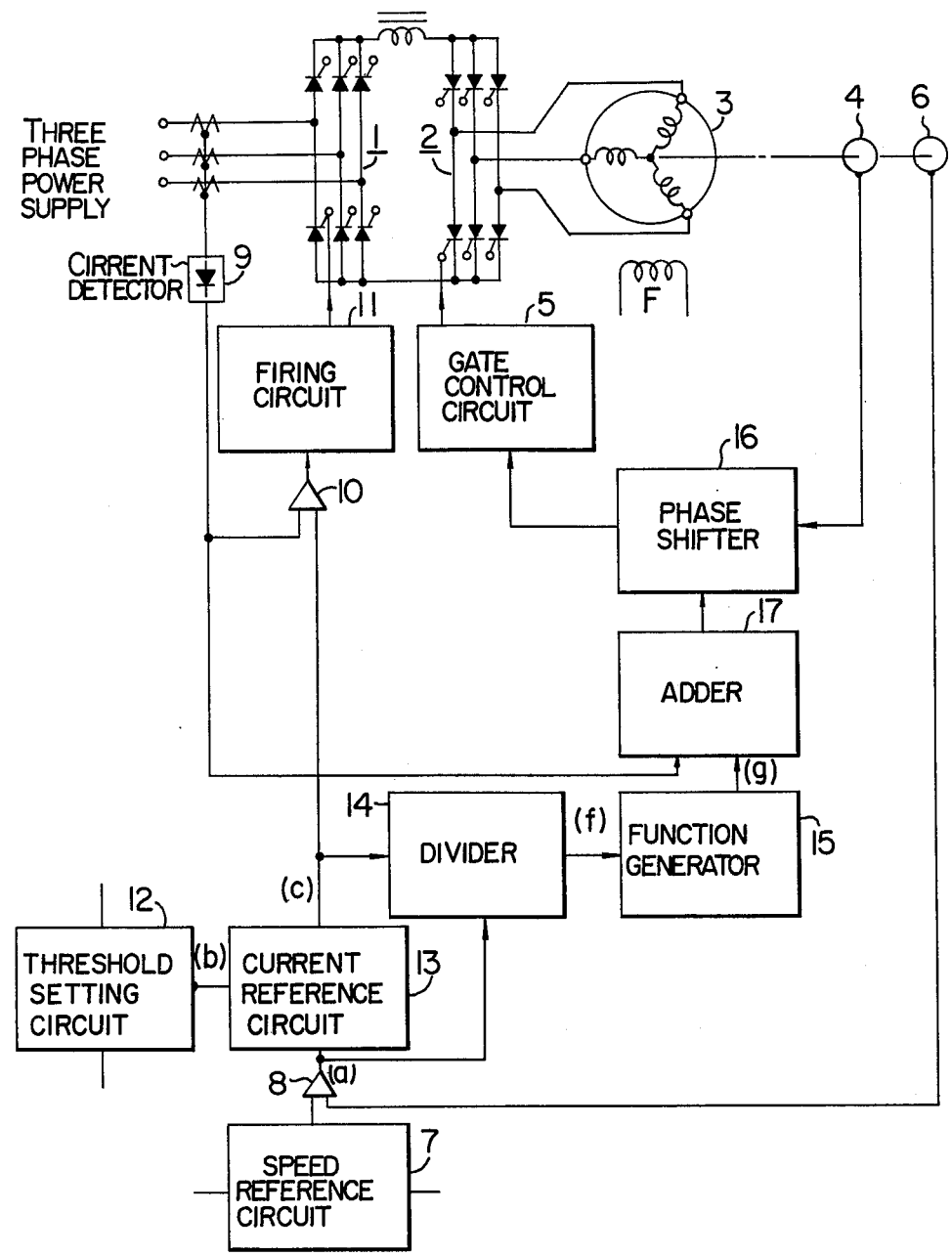
FIGS. 7 and 8 schematically show circuits of control systems for commutatorless motor, as other embodiments of the present invention.

FIG. 7 schematically shows a circuit of a control system for a commutatorless motor, as another embodiment of the present invention, which is so designed as to prevent such a degradation in accuracy. The difference of this embodiment from the embodiment shown in FIG. 2 is the provision of an adder 17 for summing the output of the current detector 9 and the output signal g of the function generator circuit 15, the output of the adder 17 being applied as a control input voltage to the phase shifter circuit 16. The overlapping angle u is approximately proportional to the armature current $I_a$. A signal proportional to the current $I_a$ is obtained by the current detector 9 and added to te signal g in the adder 17. The signal obtained by the current detector 9 has its amplitude adjusted in such a manner that the phase of the armature current is advanced by u/2. Accordingly, the degree of phase shift by the phase shifter circuit 16 is previously advanced by u/2 so that the degradation in accuracy can be prevented.

The output signal f of the divider 14 in FIG. 2 takes a constant value in the continuous range A and is proportional to the torque reference signal a in the discontinuous range B, as is clear from the expressions (4a) and (4b). The divider may therefore be replaced by a function generator circuit.

Figure 8:
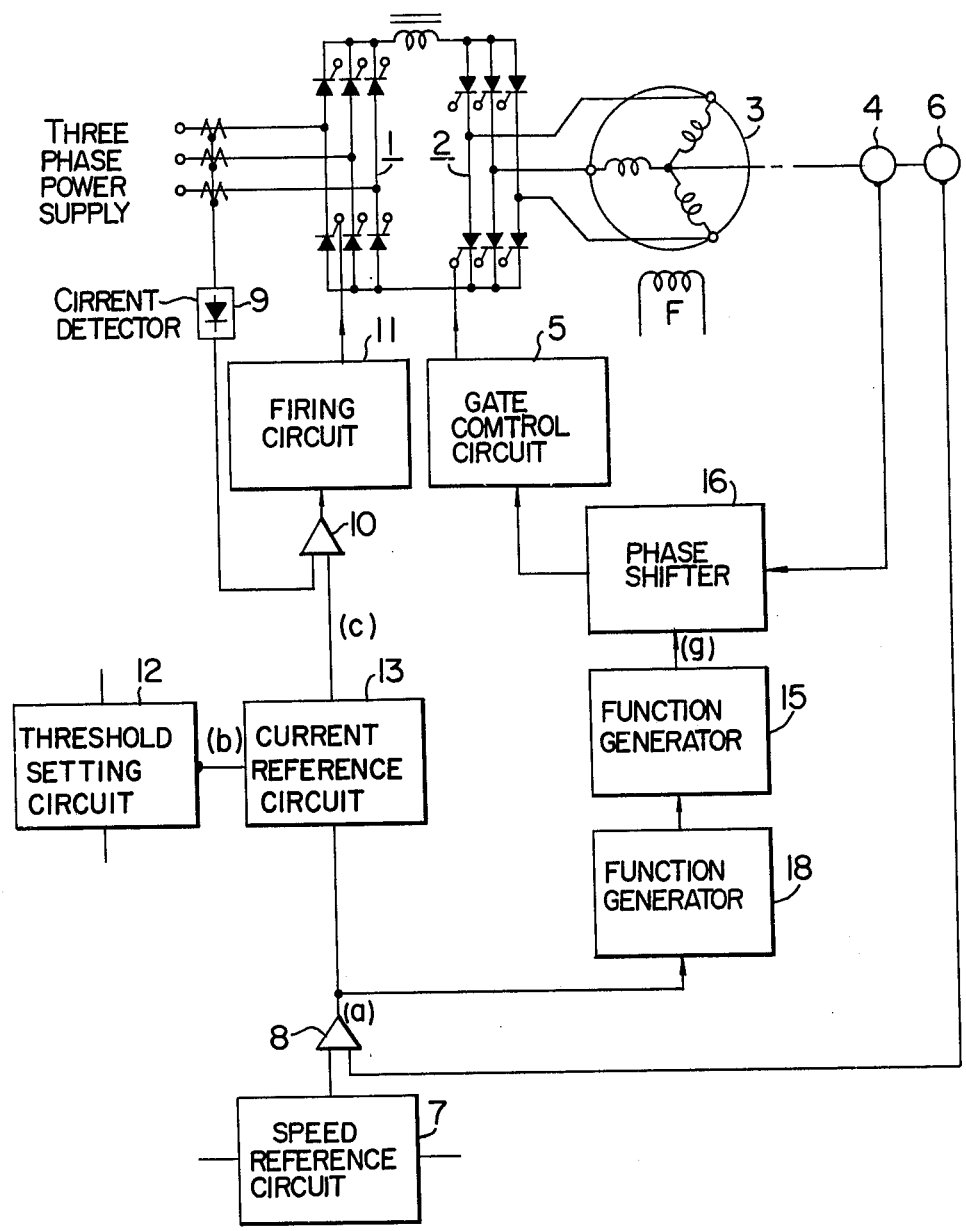

FIG. 8 schematically shows a circuit in such a case where a function generator circuit 18 for generating functions satisfying the formulae (4a) and (4b) is provided between the speed deviation amplifier 8 and the function generator circuit 15. The function of the function generator circuit 18 may be attained by an operational amplifier having a limiter. The circuit configuration is simpler in case of the operational amplifier than in case of the divider. Further, the function generator circuits 15 and 18 may be replaced by a single function generator, as is also the case with the embodiment in FIG. 7.

The current intermittent threshold varies depending upon the amplitude of the field winding current and the speed of the motor. The reason why the threshold varies according to such factors, will be described briefly. The intermittence of current is due to the fact that the current pulsates by the effect of ripple components contained in the dc output of the rectifier 1 and the dc input and output of the inverter 2. The amplitudes of the ripple components depend on the firing angles and the ac source voltage. For example, if the current through the field winding is kept constant, the terminal voltage of the synchronous motor 3 rises as the rotational speed increases, so that the firing angle of retardation becomes small. In such a case, the ripples from the rectifier 1 decrease and the current pulsation also decreases, that is, the threshold is rendered small.

In case where the field winding current varies, the firing angle of retardation and the ripples also change so that the threshold is changed accordingly.

Since the current intermittent threshold changes depending upon the field winding current and the rotational speed as described above, the current intermittent threshold can be rendered small by changing the threshold value b of the current intermittent threshold setting circuit 12 in accordance with the field winding current and the rotational speed. Consequently, the power factor in case of light load can be improved. In order to realize the conditions described above it is only necessary to apply to the current intermittent threshold setting circuit 12 the speed signal from the speed detector 6 or a signal corresponding to the field winding signal to use a function generator for generating a pattern corresponding to the threshold value. There are various such patterns, which are determined by obtaining the pulsating amplitude of current through calculation.

Figure 9:
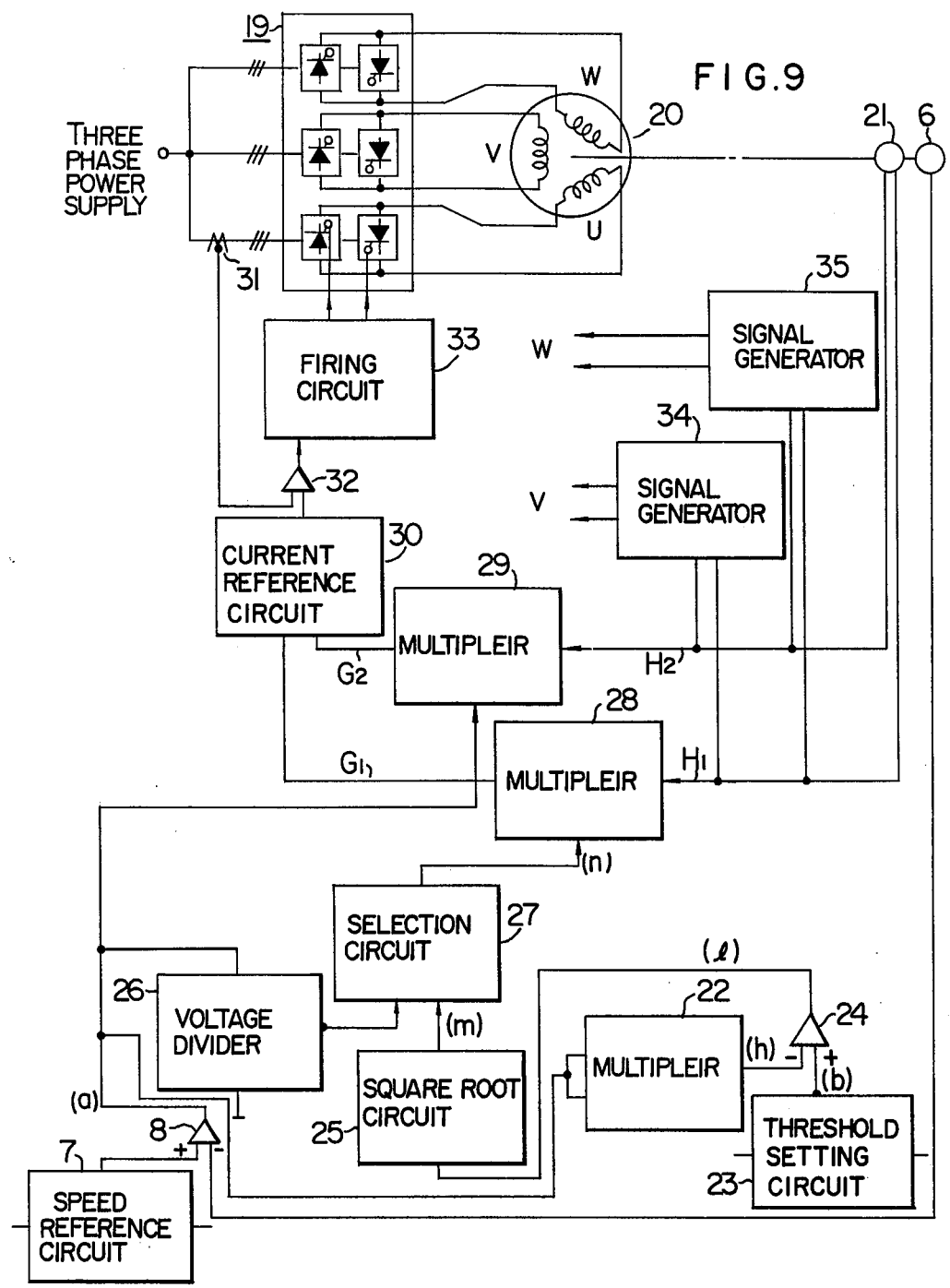
FIG. 9 schematically shows a circuit of an embodiment of the present invention, applied to a commutatorless motor of sinusoidal current source type.

FIG. 9 schematically shows a circuit of a control system for a commutatorless motor, as another embodiment of the present invention.

This embodiment uses as the frequency converter a cycloconverter consisting of inverse-parallel connected thyristor bridges connected in Gratz configuration with the three-phase windings U, V and W of the synchronous motor. Such a frequency converter is hereafter referred to as a cycloconverter of sinusoidal current source type.

As well known, the sinusoidal current source type cycloconverter can control the armature current in sinusoidal fashion in accordance with the sinusoidal current reference signal. Also with a control system for a commutatorless motor, using such a cycloconverter, if the current intermits, not only arises the above mentioned undesirable problem, but also the control of the armature current in sinusoidal fashion becomes impossible. However, these problems can be solved by the present invention.

Reference should now be made to FIG. 9, in which the parts identical with those in FIG. 2 are designated by the same reference symbols and numerals. A cycloconverter 19 of sinusoidal current source type consist of inverse-parallel connected thyristor bridges connected in Gratz configuration with the armature windings corresponding to phases U, V and W of a synchronous motor 20, the armature windings U, V and W being electrically separated from one another. An angular position detector 21 delivers sinusoidal position signals (two-phase signals) $H_1$ and $H_2$ having phases corresponding to the angular positions of the rotor of the motor 20. The angular position detector 21 may be constituted of, for example, a permanent magnet attached to the rotor and two Hall generators attached onto the surface of the stator facing the rotor. The angular position detector 21 for delivering two-phase signals is used since the constitution of the detector can be simplified and the number of signal lines connecting the detector with the control circuit can be decreased, by decreasing the number of points where the position signals are to be picked up. The position signals $H_1$ and $H_2$ are used to control the position of the armature winding of phase U. Signal generators 34 and 35 deliver signals respectively having phases different by 120° from the phases of the position signals $H_1$ and $H_2$ and these signals are used to indicate the angular positions of the armature windings of V and W phases. The control circuits for the phases V and W are the same as that for the phase U and the description of them are omitted. A multiplier 22 squares the output signal a of the speed deviation amplifier 8 and a current intermittent threshold setting circuit 23 sets the threshold value of the armature current $I_a$ at which the current $I_a$ starts intermitting. This circuit 23 is the same as the circuit 12 in FIG. 2. A subtractor 24 subtracts the output signal $a^2$ of the multiplier 22 from the threshold value $b$ set in the threshold setting circuit 23. A square root circuit 25 extracts the square root of the output signal of the subtractor 24 and a voltage divider 26 divides the output signal $a$ of the speed deviation amplifier 8. The voltage divider 26 serves to select at an arbitrary value the phase of the armature current in the continuous range. A selection circuit 27 receives the outputs of the voltage divider 26 and the square root circuit 25 and delivers the larger one of them as an output. A multiplier 28 multiplies the position signal $H_1$ of the angular position detector 21 by the output of the selection circuit 27 and a multiplier 29 multiplies the position signal $H_2$ of the angular position detector 21 by the output signal $a$ of the speed deviation amplifier 8. A current reference circuit 30 sums the outputs of the multipliers 28 and 29 and delivers a sinusoidal current reference signal for specifying the amplitudes and phases of the three-phase armature currents. A current detector 31 detects the input current to the U-phase branch of the cycloconverter 19. A current deviation amplifier 32 amplifies the deviation of the output of the current detector 31 from the current reference signal and a firing circuit 33 controls the firing phases of the cycloconverter 19 in accordance with the output signal of the current deviation amplifier 32.

The general operation of such a control system for a commutatorless motor as having the above described constitution is well known. In fact, the output current of the cycloconverter 19 is controlled in sinusoidal fashion in accordance with the sinusoidal current reference signal supplied from the current reference circuit 28. The current reference signal is made up of the torque reference signal $a$ and the position signals $H_1$ and $H_2$. As a result, the amplitude of the armature current is so controlled as to be proportional to the torque reference signal $a$ and the phase of the armature current is also controlled so as to have a predetermined relation to the phase of the position signal $H_1$. The predetermined relation is the same as in the case of the above mentioned commutatorless motor of dc link type so far as the armature winding voltage and current of the synchronous motor are concerned. The present invention can therefore be applied also to the commutatorless motor, using a cycloconverter of sinusoidal current source type.

Now, the fundamental operation of the circuit shown in FIG. 9 will be described. This embodiment is also controlled in accordance with the vectorical conditions described with FIG. 4. Moreover, the quadrature-axis component $I_Q$ of the armature current $I_a$ is similarly controlled in accordance with the torque reference signal $a$ as the output of the speed deviation amplifier 8. Namely, the amplitudes of the direct-axis components of the armature current (i.e. the signals proportional to the direct-axis components) in both the ranges A and B are first calculated on the basis of the signal $a$ in accordance with the vectorical relations shown in FIG. 4. Secondly, a signal for specifying the direct-axis current is obtained by making a product of the position signals from the angular position detector 21, the thus obtained signals proportional to the direct-axis components and the signal $a$ while a signal for specifying the quadrature-axis current is obtained by multiplying the position signals by the signal $a$. Finally, the signals for specifying the direct-axis current and the quadrature-axis current are added together to form a current reference signal according to which the armature current is controlled. This is the fundamental operation of the circuit in FIG. 9 and next the further detailed description will be made of the concrete operations of constituents.

The multiplier 22 for squaring the torque reference signal $a$ delivers as an output a signal $h$ proportional to $a^2$. The subtractor 24 subtracts the signal $h$ from the preset value $b$ of the current intermittent threshold setting circuit 23 and delivers a signal $l$. The square root circuit 25 delivers a signal $m$ equal to the square root of the signal $l$. The selection circuit 27 delivers the larger one of the signal $m$ and the output of the voltage divider 26. It follows therefore that In range A (for $k_2 \cdot a > m$), $$n = k_2 \cdot a \tag{8a}$$

In range B (for $k_2 \cdot a \leq m$), $$n = m \tag{8b}$$

where $n$ is the output of the selection circuit 27 and $k_2$ is a constant determined depending upon the voltage divider 26.

The angular position detector 21 delivers two position signals $H_1$ and $H_2$ (sinusoidal signals) out of phase by 90° from each other. These position signals are expressed by the formulae given below, with initial phases neglected.

$$\left. \begin{array}{l} H_1 = \cos \omega t \\ H_2 = \sin \omega t \end{array} \right\} \tag{9}$$

Here, the angular frequency $\omega$ in the formulae (9) coincides with the angular frequency of the motor. The amplitudes of the signals $H_1$ and $H_2$ are invariant and therefore the symbols standing for the amplitudes are omitted from the formulae (9). The multiplier 28 multiplies the position signal $H_1$ by the signal $n$ while the multiplier 29 multiplies the position signal $H_2$ by the signal $a$. Accordingly, the multipliers 28 and 29 respectively deliver the signals $G_1$ and $G_2$ given by the following formulae.

$$\left. \begin{array}{l} G_1 = H_1 \cdot n \\ G_2 = H_2 \cdot a \end{array} \right\} \tag{10}$$

Figure 10:
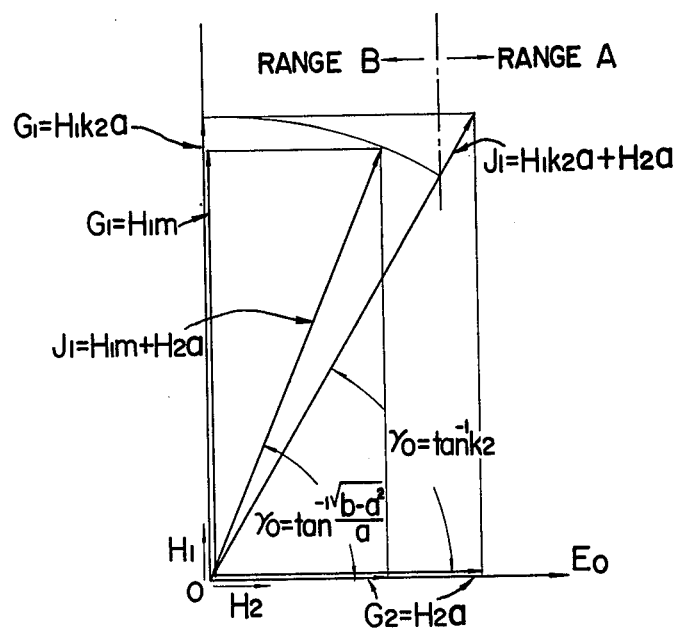
FIG. 10 is a vector diagram useful in explaining the operation of the circuit in FIG. 9.

As seen from FIG. 10, the output signal $G_1$ of the multiplier 28 is a signal for specifying the direct-axis current out of phase by 90° from the nominal induced electromotive force $E_o$ while the output signal $G_2$ of the multiplier 29 is a signal for specifying the quadrature-axis current in phase with the nominal induced electromotive force $E_o$. The signals $G_1$ and $G_2$ are summed in the current reference circuit 30 to obtain a sinusoidal current reference signal $J$ for specifying the armature current through the armature winding of phase U of the synchronous motor 20. There are obtained three such current reference signals for the respective phases and the armature currents of phases U, V and W are controlled respectively by those current reference signals. In the following description only one phase (phase U) is mentioned to avoid redundant explanation.

The signals $G_1$ and $G_2$ are summed at the ratio of 1 : 1 to obtain a current reference signal $J_1$ given by the following expression. The signal $J_1$ is obtained by the vector synthesis of the signals $G_1$ and $G_2$, as seen from FIG. 10.

$$J_1 = \dot{G}_1 + \dot{G}_2 = H_1 \cdot n + H_2 \cdot a \qquad (11)$$

The substitution of the formulae (9) into the formula (11) and the transformation yields $$J_1 = \sqrt{a^2 + n^2} \sin(\omega t + \gamma_o) \qquad (12)$$

where $\gamma_o = \tan^{-1}(n/a)$.

The current deviation amplifier 32 compares the current reference signal $J_1$ with the output of the current detector 31 and supplies the deviation of the latter from the former, to the firing circuit 33. The firing circuit 33 controls the firing phases in accordance with the deviation signal so that gating signals are supplied to the thyristor bridge circuit for the phase U of the cycloconverter. The order of the application of the gating signals to the bridge circuits and to the thyristors in each bridge circuit, is determined depending on the directions of the armature currents and the amplitudes of the armature currents. Consequently, the armature current $I_{au}$ of phase U is so controlled as to be proportional in amplitude to and in phase with the current reference signal $J_1$.

The reason why the armature current does not intermit and why the change in the response is prevented, according to the control described above will be explained.

The output signal $n$ of the selection circuit 27 is given by $k_2 \cdot a$ in the continuous range A. The current reference signal $J_1$ in the range A is therefore obtained from the formula (12) such that $$J_1 = \sqrt{1 + k_2^2} \cdot a \sin(\omega t + \tan_{-1} k_2) \qquad (13)$$

As apparent from the formula (13), the armature current $I_{au}$ is so controlled as to be proportional in amplitude to the torque reference signal and to have a phase difference $\gamma_o$ determined depending on $\tan^{-1} k_2$ with respect to the nominal induced electromotive force $E_o$.

On the other hand, in the discontinuous range B, the multiplier 28 receives $\sqrt{b - a^2}$ as the input $n$. The current reference signal $J_1$ in the range B is therefore obtained from (12) such that $$J_1 = \sqrt{b} \sin(\omega t + \tan^{-1} \frac{\sqrt{b - a^2}}{a}) \qquad (14)$$

Namely, the armature current in the range B has its amplitude rendered constant and has no relation to the torque reference signal, the constant value being determined by the preset threshold value $b$. The phase difference $\gamma_o$ of the armature current in the range B is so controlled as to equal $$\tan^{-1} \frac{\sqrt{b - a^2}}{a}.$$

In view of the term $$\tan^{-1} \frac{\sqrt{b - a^2}}{a}$$

in the formula (14), which is associated with the phase difference $\gamma_o$, it is understood that the torque reference signal $a$ corresponds to the quadrature-axis component $I_q$ and that $\sqrt{b - a^2}$ corresponds to the direct-axis component $I_d$ since $\sqrt{b}$ specifies that the amplitude of the armature current $I_{au}$. The formulation of this by mathematical terms yields $$\gamma_o = \tan^{-1} \frac{\sqrt{b - a^2}}{a} = \tan^{-1} \frac{I_d}{I_q} \qquad (15)$$

It is apparent from the expression (15) that the phase difference $\gamma_o$ varies depending on the torque reference signal $a$. For example, the phase difference becomes large when the signal $a$ turns small. Accordingly, it is understood that in the discontinuous range B the amplitude of the armature current is kept constant while the phase of the armature current is varied in accordance with the torque reference signal $a$.

The torques $\tau$ in both the range, obtained by substituting the current conditions (the relations between current amplitude and phase) described above into the formula (1), are reduced to the following expressions.

In range A, $$\tau = k'_c \cdot a \sqrt{1 + k_2^2} \cos \tan^{-1} k_2 = k'_c \cdot a \qquad (16a)$$

In range B, $$\tau = k'_c \cdot \sqrt{b} \cos \tan^{-1} \frac{\sqrt{b - a^2}}{a} = k'_c \cdot a \qquad (16b)$$

where $k'_c$ is the gain for $\tau/a$.

It is apparent from (16a) and (16b) that the torques $\tau$ in both the regions are proportional to the torque reference signal $a$ and that $\tau/a$ is constant.

As described above, also in case of the embodiment shown in FIG. 9, the amplitude and the phase of the armature current can be controlled according to the conditions depicted by FIG. 6 so that the current intermittence and therefore the resultant drawbacks described above can be prevented. Moreover, since the control can be so performed that the torque reference signal $a$ may be proportional to the quadrature-axis component $I_q$, then the ratio of the torque to the output of the speed deviation amplifier 8 can be kept almost constant independent of the amplitude of the armature current and therefore a preferable characteristic for a stable speed control circuit can be obtained.

As described above, according to the present invention, the intermittence of the armature current can be prevented by keeping the amplitude of the armature current constant and by controlling the phase of the current, when the current reaches its threshold value. As a result, the change in the response of the current control circuit can be prevented so that the response in the speed control loop can be improved.

In the foregoing description of the embodiments of the present invention, the phase of the armature current is so controlled as to be rendered constant in the continuous range. However, the present invention is not limited to these embodiments, but it is also possible to change the phase of the armature current, for example, where the power factor control must be performed. This mode of control can be easily realized, with the embodiment shown in FIG. 2, by adding a signal for specifying the change in the current phase to the signal given by the expression (4a), to be applied to the phase shifter circuit. Also in case of the embodiment shown in FIG. 9, the same effect can be realized by changing the voltage dividing ratio of the voltage divider in such a manner that the constant $k_2$ in the formula (8) is changed. It is clear that the voltage dividing ratio can be electrically controlled by the use of, for example, an operational amplifier.

Further, it is preferable to set the current intermittent threshold value to be slightly larger than the value at which the armature current actually starts intermitting. However, the same effect can also be enjoyed even if the threshold value is set with a large margin.

We claim:

1. A control system for a commutatorless motor, comprising:
   (a) a synchronous motor having polyphase armature windings and a field winding;
   (b) a frequency converter for supplying alternating currents having variable frequencies for said armature windings;
   (c) an angular position detector for detecting position signals corresponding to the angular positions of the rotor of said synchronous motor; and
   (d) a speed control circuit for delivering a torque reference signal by comparing the actual speed of said synchronous motor with the reference speed; said control system is characterized by further comprising;
   (e) a current control circuit for controlling the amplitude of the output current of said frequency converter in accordance with said torque reference signal and for maintaining the amplitude of the output current of said frequency converter constant when said torque reference signal takes a value corresponding to the discontinuous range; and
   (f) a phase control circuit for controlling the phase of said output current of said frequency converter in accordance with said position signal and for rendering said phase of said output current of said frequency converter variable in accordance with the amplitude of said torque reference signal when said torque reference signal takes a value corresponding to said discontinuous range.

2. A control system for a commutatorless motor, as claimed in claim 1, wherein said frequency converter (b) comprises:
   ($b_1$) a rectifier for converting alternating current into direct current, and
   ($b_2$) an inverter for inverting the dc output of said rectifier into alternating current to be applied to said armature windings.

3. A control system for a commutatorless motor, as claimed in claim 2, wherein said current control circuit (e) comprises:
   ($e_1$) a current intermittent threshold setting circuit for setting a threshold value at which said armature current starts intermitting, and
   ($e_2$) a current reference circuit for comparing said torque reference signal with said threshold value and for delivering the larger one of them as a current reference signal, and wherein said phase control circuit (f) comprises;
   ($f_1$) a gate control means for shifting the phases of said position signals and for controlling the firing of said inverter, and
   ($f_2$) a phase shift reference means for determining the degree of phase shift by said gate control means in accordance with the ratio of said torque reference signal to said current reference signal.

4. A control system for a commutatorless motor, as claimed in claim 3, wherein said current intermittent threshold setting circuit ($e_1$) is a threshold setting circuit whose set value is made variable in accordance with the actual speed of said synchronous motor.

5. A control system for a commutatorless motor, as claimed in claim 3, wherein said current intermittend threshold setting circuit ($e_1$) is a threshold setting circuit whose set value is made variable in accordance with the value of the current through said field winding.

6. A control system for a commutatorless motor, as claimed in claim 3, wherein said degree of phase shift of said phase shift reference means ($f_2$) is determined on the basis of the sum of the ratio of said torque reference signal to said current reference signal and the overlapping angle of commutation of said inverter.

7. A control system for a commutatorless motor, as claimed in claim 1, wherein said pholyphase armature windings and said field winding of said synchronous motor are electrically insulated from one another and said frequency converter consists of inverse-parallel connected thyristor circuits connected in Gratz configuration with said armature windings of respective phases.

* * * * *